June 25, 1940.   L. G. BARTLETT ET AL   2,205,999
TRUCK
Filed Nov. 10, 1936
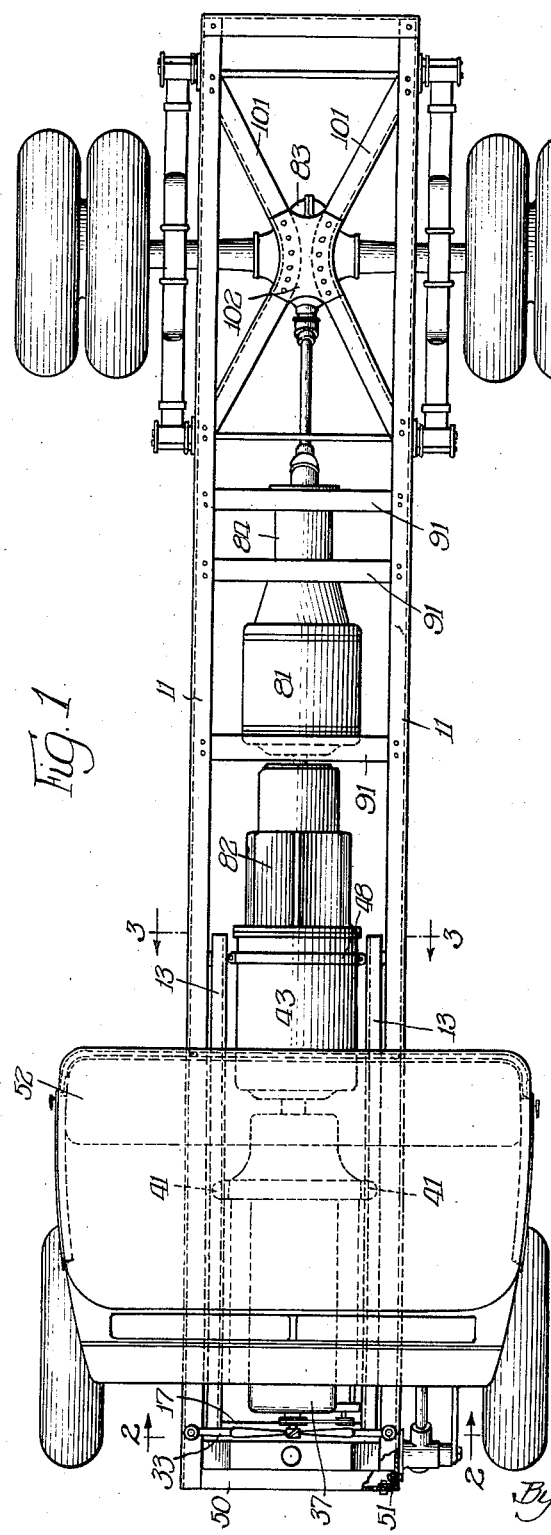
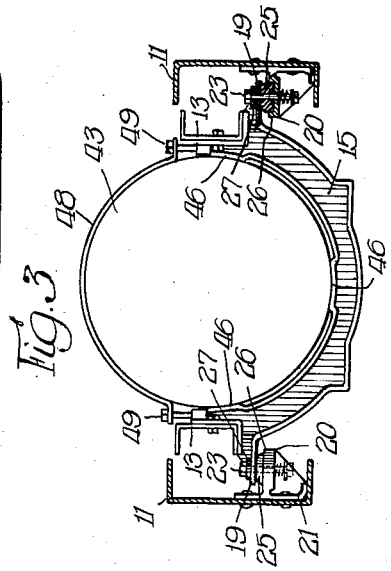
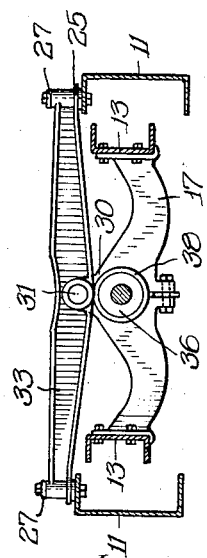
Inventors:
Linton G. Bartlett,
Harry B. Holthouse,
By Foorman L. Mueller
Atty Patented June 25, 1940

2,205,999

UNITED STATES PATENT OFFICE 2,205,999

TRUCK

Linton G. Bartlett, North Chicago, and Harry B. Holthouse, Chicago, Ill., assignors, by direct and mesne assignments, of fifty-one per cent to Edward P. Molloy, Chicago, Ill., twenty-two per cent to The Northern Trust Company, as trustee, Chicago, Ill., a corporation of Illinois, and twenty-seven per cent to Harry B. Holthouse, Chicago, Ill.

Application November 10, 1936, Serial No. 110,086

6 Claims. (Cl. 248—6)

This invention relates to trucks, and has been illustrated as embodied in a gas-electric truck. In some of its aspects, however, it is also applicable to other trucks or vehicles.

In its illustrated form the invention includes a truck frame, a sub-frame removably supported thereby, an internal combustion engine, and a pair of generators carried by said sub-frame, a motor and transmission assembly, and conventional wheels and axles from which the frame is suspended by springs.

One object of the invention is to provide a truck which, because of various novel features, can be manufactured more economically than any comparable trucks heretofore.

Another object of the invention is to provide a gas-electric combination in which the engine and generators may be withdrawn as a unit for repair or for test operation.

Still another object of the invention is to provide an improved type of reinforcement for the frame.

Other objects and advantages of my invention will be apparent from the following drawing, in which:

Fig. 1 is a top plan view of the truck with the main truck body portion omitted, and with parts broken away for the sake of clarity.

Fig. 2 is a sectional view substantially along the line 2—2 of Fig. 1.

Fig. 3 is a sectional view substantially along the line 3—3 of Fig. 1.

Although this invention may take numerous forms, only one has been chosen for the purpose of illustration. In this form the truck includes a main frame 11 and a sub-frame 13. A cab 52 is suitably supported on the frame 11, and arranged to straddle an engine 37. As discussed below, an engine 37 and a generator 43 are mounted on the sub-frame and drive a motor 81 which drives the wheels through a transmission 84.

The sub-frame 13 includes any suitable number of transverse members, two such members being used in the illustrated form, namely the cradle 15 and the hanger 17, both of which are riveted or otherwise permanently secured to the longitudinal members, to which numerals 13 are applied, to form a rigid frame. This frame is supported by the main frame 11 by three-point suspension. Thus the cradle 15 is provided with arms 19 which are supported by arms 20 of brackets 21 secured to the main frame 11. Each arm 19 is secured in place by a pair of bolts 23. A rubber cushion 25 carried by cup 26 separates the arm 19 from the arm 20, and a second rubber cushion 27 absorbs the reaction. As seen at the right of Fig. 3, the cushion 27 also separates the arm 19 from the bolt 21.

The third point of suspension is at the front of the sub-frame 13. The hanger 17 is provided with an upwardly extending arm 30 which carries a trunnion 31 which is journalled in a suitable boss on a cross member 33 which is secured directly to the longitudinal members of the main frame 11, with substantially the same cushioning means shown in connection with arms 20 and 21.

The front trunnion support 36 of the engine 37 is held by a ring 38 forming part of the hanger 17, and the engine is keyed against pivoting with respect to said hanger. The rear support legs 41 of the engine are rigidly secured to the longitudinal sub-frame members 13. The front end of a generator 43 is rigidly secured to the engine 37 and its rear end is supported by the cradle 15. The cradle 15 is provided with raised seats 46 which may be ground if necessary to fit snugly the generator 43. A clamping band 48 is provided for holding the generator firmly in place, and is tightened by the bolts 49.

From the foregoing it is seen that the engine and generator assembly are rigidly secured to the sub-frame 13 which in turn is secured by the three-point suspension to the main frame 11. The rubber cushions 25 and 27 between the sub-frame 13 and the main frame 11 act to retard the transmission of vibrations and noise to the main frame.

The front cross member 50 of the main frame is removably secured to the longitudinal members 11 by bolts which pass through the main frame and through the angle iron 51, which are riveted to the cross member 51, as seen best in Fig. 1. By removing the cross member 50 and by disconnecting the sub-frame cross members 33 and 15 from the main frame members 11, the sub-frame together with its engine and generators may be drawn out from the truck for test operation or for repair.

A driving motor 81 is driven by the generator 43 and an exciter 82 which is rigidly mounted on and rotates with the generator. The driving motor 81 may be connected directly to the differential 83 or in fact there may be two driving motors each connected directly to one of the driving wheels. The motor and transmission assembly 84 are secured to the cross members 91 in any suitable manner, the members 91 being in turn secured to the frame 11.

The frame 11 is reinforced with angle iron members 101, which are provided on each side of the truck, each of these angle members being bent, as clearly seen in Fig. 1. A plate 102 is riveted to each of the angle members so that the frame is thus rigidly held against distortion within the plane of the frame. The provision of X-braces is conventional, but the present form is a very great simplification as compared with previous braces of this type.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

We claim:

1. A vehicle including in combination a main frame having a longitudinally extending support member on each side thereof, and a sub-frame removably supported therefrom carrying an engine-generator apparatus, said sub-frame comprising a pair of longitudinally extending frame members, a generator supporting cradle rigidly secured at one end of the sub-frame having a mounting arm extending outwardly from each side thereof, an engine hanger rigidly secured at the other end of the sub-frame and including an integral extension on the upper side thereof for removable connection with the main frame, and cushioning means intermediate the main frame and cradle mounting arms.

2. A vehicle including in combination, a main frame having a longitudinally extending support member on each side thereof, and a sub-frame removably supported therefrom carrying an engine-generator apparatus, means for supporting the sub-frame on the main frame at one end of the sub-frame, and a cradle rigidly secured to the sub-frame at the other end thereof for supporting the sub-frame on the main frame at that end, said cradle having a body portion with a substantially semi-circular inner surface with grindable projections thereon for fitting to the exterior surface of the generator, a removable strap fitting over said generator and cooperating with said cradle for securely but removably carrying said generator thereon, and extensions on said cradle to each side thereof for connection with said main frame.

3. A vehicle including in combination a main frame having a longitudinally extending support member on each side thereof, and a sub-frame removably supported therefrom carrying an engine-generator apparatus, said sub-frame comprising a pair of longitudinally extending frame members, a generator supporting cradle rigidly secured to each of the longitudinally extending sub-frame members at one end of the sub-frame, said cradle having a mounting arm extending outwardly beyond the corresponding sub-frame member from each side thereof, with each mounting arm being operatively connected with a corresponding main frame member and cushioning means intermediate the main frame and cradle mounting arms.

4. The combination of a sub-frame, a prime mover rigidly secured to the sub-frame and including a crank shaft, a driven unit rigidly secured to the sub-frame and co-axially mounted with the crank shaft and connected to the prime mover by a substantially rigid shaft connection, means for mounting said driven unit on said sub-frame having extensions thereon for mounting said sub-frame on a main frame in two oppositely disposed points and a main frame supporting said sub-frame with only a three-point suspension whereby distortion of the sub-frame upon flexing of the main frame is eliminated, two of the said suspension points being the said two oppositely disposed points at which the extensions on the said mounting means for the driven unit are supported on said main frame.

5. A vehicle including in combination a main frame having a pair of substantially parallel spaced apart side members, a sub-frame for supporting power apparatus thereon including a pair of substantially parallel spaced apart side members, transverse means connected with said sub-frame side members in oppositely disposed points acting in combination to support the power apparatus at one end on said sub-frame and to support the sub-frame on said main frame, said means being operatively connected with said main frame in only two points, and means for supporting the other end of said sub-frame on said main frame.

6. A vehicle including in combination a main frame having a longitudinally extending support member on each side, and a sub-frame supported on said main frame carrying power apparatus thereon for said vehicle, said sub-frame having a pair of longitudinally extending members, means acting simultaneously for supporting said power apparatus at one end on said sub-frame and for supporting said sub-frame on said main frame members, said means including a transverse member rigidly secured to each of the longitudinally extending sub-frame members, and having an extension to each side thereof for operative supporting connection with said main frame longitudinally extending members, and means at the other end of said sub-frame for operatively connecting said sub-frame with said main frame in a single point.

LINTON G. BARTLETT.
HARRY B. HOLTHOUSE.